United States Patent
Powers, Jr.

[15] 3,690,456
[45] Sept. 12, 1972

[54] GLASS CONTAINER CRACK DETECTOR

[72] Inventor: Whitney S. Powers, Jr., Pine City, N.Y.

[73] Assignee: Powers Manufacturing, Inc., Elmira, N.Y.

[22] Filed: June 25, 1971

[21] Appl. No.: 156,769

[52] U.S. Cl. .............. 209/73, 209/111.7, 198/33 AB
[51] Int. Cl. .............................................. B07c 5/342
[58] Field of Search ......... 209/111.7, 73; 198/33 AB; 250/223 B, 224; 356/240

[56] References Cited
UNITED STATES PATENTS
3,101,848  8/1963  Uhlig ................ 209/111.7 X
3,348,049  10/1967  Stacey ................ 250/223 B X

*Primary Examiner*—Allen N. Knowles
*Attorney*—Arthur H. Seidel et al.

[57] ABSTRACT

Glass containers are inspected for cracks and similar defects by a machine which will rotate the container during inspection in a manner so that the finish will rotate true and will simultaneously hold the container down against any vertical forces resulting from rotation of a container body which is out of round or tapered.

7 Claims, 2 Drawing Figures

PATENTED SEP 12 1972

INVENTOR
WHITNEY S. POWERS, JR.

BY
Seidel, Gonda & Goldhammer
ATTORNEYS.

INVENTOR
WHITNEY S. POWERS, JR.

BY
Seidel, Gonda & Goldhammer
ATTORNEYS.

GLASS CONTAINER CRACK DETECTOR

This invention relates to a crack detector, and more particularly, to a crack detector which is structurally interrelated in a manner so as to take into consideration various inherent defects in glass containers. All glass containers are formed in the plastic state in a mold. The rate of production and their cost are controlled by the cooling time interval required to acquire sufficient rigidity to stand alone. When production rates are too high, the bottles tend to lean over like a warm candle. Typically, the container manufacturers operate the equipment at speeds which are as fast as possible without excessive leaners.

Due to the above reasons, a glass container body is seldom exactly round or straight. The glass invariably deforms slightly as the mold opens. If the bottle is left in the mold long enough to acquire complete rigidity, thermal stress will have become excessive and breakage will occur prior to annealing.

The crack detector of the present invention is structurally interrelated in a manner so as to force the finish or neck of the bottle, which is the critical inspection area, to rotate true and permit the body to rotate out of true. Also, the machine will hold the container down against any vertical forces generated by the container rotating with a body which is tapered or out of round. Further, a sensor mount is provided in a manner which will be true with the finish of the bottle within the out-of-round limits of the finish only and located so that it will vibrate with the container.

All of the above is accomplished without interfering with the continuous linear movement of the bottle on a conveyor. This is accomplished by utilizing a bottle finish guide supported by a reciprocal first carriage mounted above the conveyor. A linear rotation belt is provided to engage a side of the container and rotate the same while the container is engaged by the pair of finish guide rollers and a pair of clamping rollers. The clamping rollers are positioned so as to contact the container at a location between the locations of the contact between the container, the rotation belt, and the finish guide rollers.

The finish guide rollers are supported by a first carriage which reciprocates along the conveyor. The clamping rollers are supported by a second carriage which reciprocates along the conveyor. The carriages are synchronized for movement with each other so that bottles may be inspected continuously without stopping the bottles while permitting inspection at high speed rates.

It is an object of the present invention to provide a novel crack detector.

It is another object of the present invention to provide a novel crack detector which requires the finish to rotate true while permitting a body to rotate out-of-true.

It is another object of the present invention to provide a novel crack detector which holds a container down against any vertical forces generated by rotation of a container body which is tapered or out of round.

It is another object of the present invention to provide a novel crack detector wherein a sensor mount is true with the finish of the container within the out of round limits of the finish only and will vibrate with the container.

It is another object of the present invention to provide a crack detector having greater accuracy at high speeds without stopping glass containers.

Another object of the present invention is to provide a crack detector in a manner whereby the field of view of sensors does not overlap the sealing surface of a glass container whereby the sensors cannot see seams.

Other objects will appear hereinafter.

For the purpose of illustrating the invention, there is shown in the drawings a form which is presently preferred; it being understood, however, that this invention is not limited to the precise arrangements and instrumentalities shown.

Referring to the drawing in detail, wherein like numerals indicate like elements, there is shown a crack detector of the present invention for use in connection with glass containers and designated generally as 10.

Figure 1:
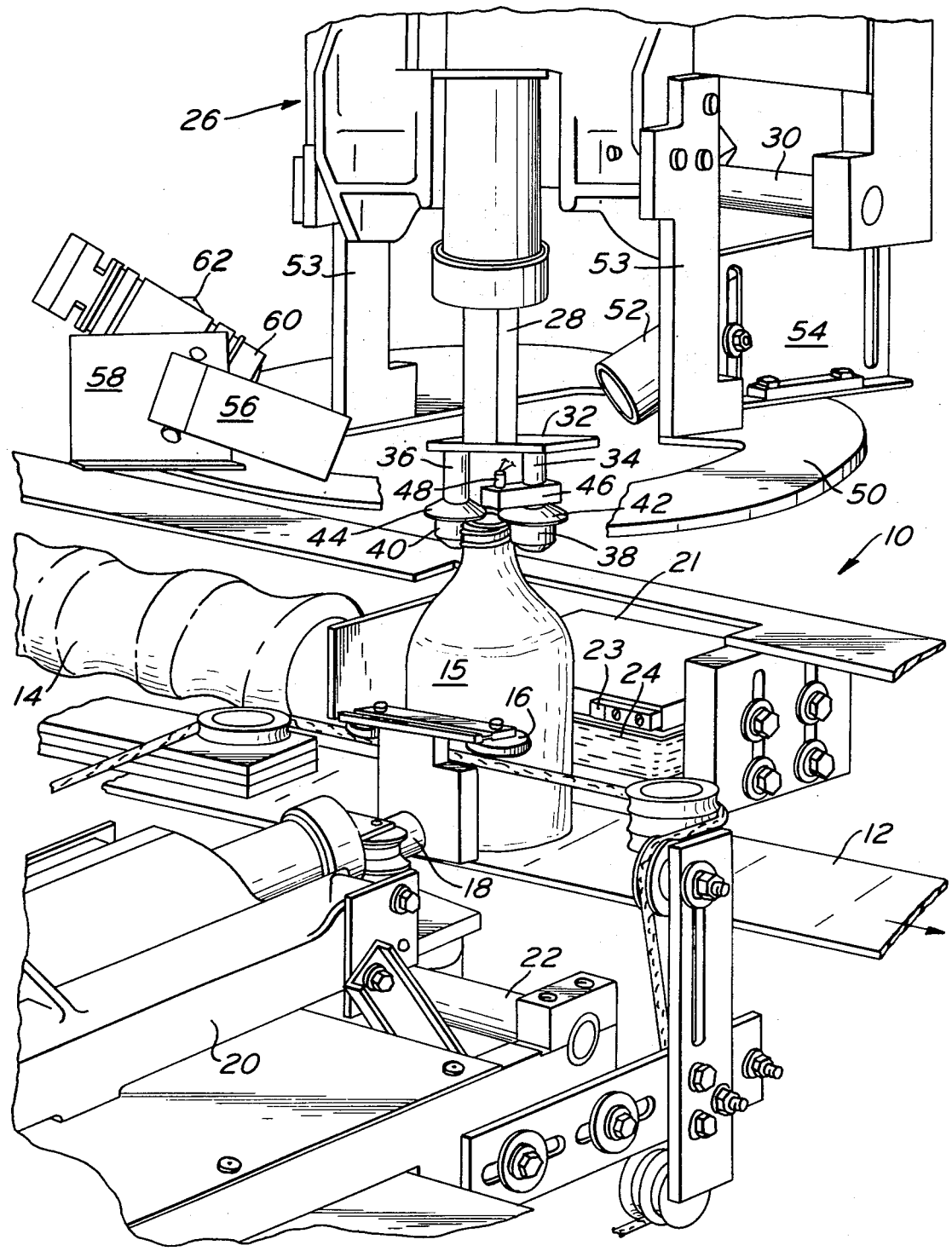
FIG. 1 is a perspective view of the crack detector of the present invention.

As shown in FIG. 1 of the drawing, the container 15 to be inspected is brought to the present invention designated generally as 10 on a linear conveyor 12 of conventional construction. The containers are spaced and sequentially moved into the test area by a feed screw 14. As the container 15 enters the test area, it is engaged by a pair of spaced rollers 16 on a horizontal plunger 18 mounted on a horizontally movable carriage 20. Carriage 20 is mounted for movement along the axes of shafts 22 (only one shaft is illustrated). While only one pair of rollers 16 is illustrated, use of two pairs of rollers disposed one above the other may be utilized more efficiently with certain types of containers.

The rollers 16 contact the container 15 and move it with the carriage 20 while pressing the container 15 against a horizontally moving endless belt 24. The belt 24 rotates the container 15 fast enough to make at least one full turn while the inspection equipment is turned on as it passes through the test area. The belt 24 extends around guide rollers 25 in housing 21. A brake block 23 of a material such as rubber and having a cam face 27 is supported by housing 21. Block 23 and its angled cam face 27 cause the container to loose contact with belt 24 and stop the container from rotating due to the pressure applied by rollers 16. Block 23 is located at the downstream end of the test area.

Figure 2:
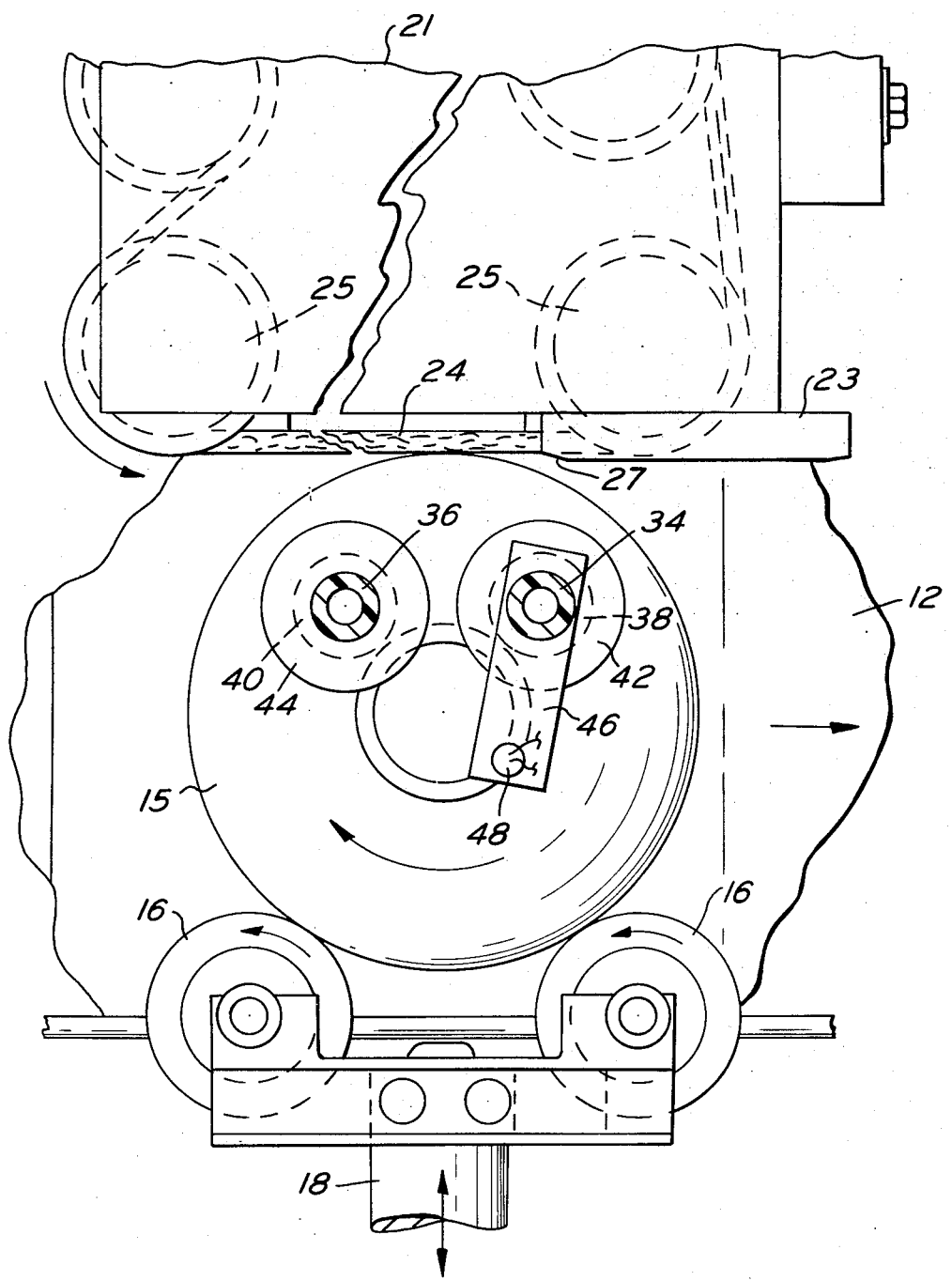
FIG. 2 is a view looking downwardly and looking through the finish guide rollers.

The belt 24 can move either opposite the direction of conveyor movement or with the direction of conveyor movement as indicated in FIG. 2. The preferred direction is with conveyor movement to facilitate the discharge down the conveyor of defective bottles which may fracture during inspection. The belt 24 is driven by a variable speed motor whose speed can be adjusted to provide the required rotation.

The apparatus described above, except for block 23, is in all material respect identical with that described in my U.S. Pat. No. 3,557,950 dated Jan. 26, 1971. The disclosure in said patent is incorporated herein by reference.

A carriage 26 having a downwardly extending plunger 28 is reciprocally mounted for horizontal movement along shafts 30 (only one shaft is illustrated). The plunger 28 is mounted for vertical movement with respect to the carriage 26. The carriages 20 and 26 are moved in synchronism through the test area at constant speed in the direction of travel of the conveyor 12 and return at a substantially sinusoidal rate after completion of the inspection of the container 15. The mechanism for reciprocating the carriages 20 and 26 in timed relation with the screw 14 as well as the mechanism for moving the plunger 28 downwardly at the beginning of the test area and upwardly at the end of the test area are described in my above-mentioned patent as well as U.S. Pat. No. 3,387,704. Further description thereof is deemed unnecessary. Each of the plungers 18 and 28 is cammed or spring-biased into contact with the container 15 at the beginning of the stroke of the carriages and biased away from the container at the end of the carriage strokes.

A mounting plate 32 is fixedly secured to the lower end of the plunger 28. Plate 32 supports parallel shafts 34 and 36. The axes of shafts 34 and 36 form a straight line parallel to the side edge of the conveyor 12.

A finish-engaging roller 38 is rotatably supported by shaft 34 and has a flange 42 adapted to overlie and contact the end face of the finish on the container 15. Roller 38 is made from a rubber or plastic material so as not to damage the finish.

A roller 40, comparable to roller 38, is rotatably supported by shaft 36. Roller 40 is provided with a flange 44 comparable to flange 42. The flanges 42 and 44 hold the container 15 downwardly against any vertical forces generated by rotation of the container 15 which may be out of round or tapered and imparted thereto by the rotation of the container 15 resulting from contact with the belt 24.

As will be apparent from FIG. 2, the distance between the outer periphery of the rollers 38 and 40 is less than the diameter of the neck of the container 15. The rollers 38 and 40 are supported in a position whereby the rollers 16 move the container 15 against rollers 38 and 40 at the same time that the body of the container 15 engages the belt 24. The stroke of the plunger 18 and the transverse location of the feed screw 14 and belt 24 are selectively adjustable to accommodate various sized containers. Plate 32 has radial adjusting slots so that the finish support rollers 38 and 40 can be moved to a position to accommodate wide mouth as well as narrow neck bottles.

The shaft 34 also supports a mount 46. The mount 46 has a hole drilled therethrough and within which is located a sensor 48 for line over finish defects. Due to the positioning of the sensor 48, any vibrations of the container 15 will cause the sensor 48 to vibrate with the container. The container 15 may be rotated by belt 24 at speeds up to or in excess of 600 rpm. The container 15 vibrates since the average container is egg-shaped. Rollers 38 and 40 resist the unbalanced forces resulting from rollers 16 trying to accommodate the egg-shaped cross section.

The carriage 26 supports in depending relation therefrom a ring 50 by means of the bracket arms 53. The ring 50 may be two semi-circular segments connected into the form of a ring with the segments at the same or at different elevations. Thus, the segments may be connected to opposite faces of a spacer so as to lie in parallel spaced-apart planes.

The ring 50 has a bracket 54 on which is adjustably mounted a light source 52. Bracket 62 on ring 50 adjustably supports a photoelectric sensor 60 which cooperates with light source 52 to detect horizontal cracks in the finish. Bracket 58 on the ring 50 adjustably supports a light source 56 which directs a beam of light to the line over finish and thereby cooperates with sensor 48. A larger number of sensors and/or light sources may be supported by the ring 50 above or below the plane thereof.

The machine of the present invention is otherwise as disclosed in said U.S. Pat. No. 3,557,950. It will be noted that the rollers 16 engage the container 15 at an elevation which is above the elevation of the belt 24 and below the elevation of the rollers 38 and 40. The rollers 16, 38 and 40 are so positioned that the bottle is held in a vertical disposition so as to avoid as far as possible any loss of stability of the container.

Successful optical inspection for defects in glass containers requires the optical elements to be extremely selective in the area they inspect so as to avoid stray light relection from threads, lugs, seams, etc. This selectivity is limited by the positional accuracy of the container being inspected. The structural interrelationships disclosed herein make it possible to obtain greater accuracy while at the same time not interfering with the ability of the containers to be inspected while being moved linearly along the conveyor 12, thereby attaining a reliable inspection at high speeds.

The container 15 as illustrated has a continuous thread on the outer periphery of the neck. When the container being inspected is of the type which has disconnected lugs, the rollers 38 and 40 will be grooved so as to accommodate the lugs while contacting a circular portion of the neck. This eliminates the bumpiness which results from the rollers contacting the discontinuous lug-type threads.

The plunger 18 may be a spring-biased plunger as disclosed in said U.S. Pat. No. 3,557,950. Likewise, the plunger 28 may be a spring-biased plunger as disclosed in U.S. Pat. No. 3,387,704.

The present invention may be embodied in other specific forms without departing from the spirit or essential attributes thereof and, accordingly, reference should be made to the appended claims, rather than to the foregoing specification as indicating the scope of the invention.

I claim:

1. Glass container inspection apparatus comprising a conveyor for conveying a glass container through a test area in a straight line at uniform speed, a first reciprocable carriage carrying a bottle finish guide for linear movement with the container during the testing, means for moving said finish guide downwardly into contact with the container at the beginning of the test and upwardly away from the container at the end of the test, said finish guide including first and second rollers spaced apart for a distance which is less than the outer diameter of the finish on the container, each roller being rotatable about a vertical axis, a line interconnecting the axes of said rollers being parallel to the edge of said conveyor, each roller having a peripheral flange for engaging the top edge of the container, an endless belt alongside the conveyor for engaging a side of the container and rotating the container about its longitudinal axis, a second reciprocable carriage, said second carriage being mounted for synchronized movement with said first carriage, said second carriage having a pair of spaced rollers for rolling contact with the container, and for holding the container into contact with said belt and into contact with said first and second rollers, and crack detector means including at least one light source and sensor mounted on said first carriage for movement therewith.

2. Apparatus in accordance with claim 1 including a mount for a line over finish sensor, said sensor mount being supported by a shaft on which one of said first and second rollers is mounted, said sensor mount projecting beyond a distance corresponding to the radius of said flange on said first and second rollers.

3. Apparatus in accordance with claim 2 wherein the crack detector means other than the sensor on said sensor mount is supported by a ring, said ring being supported by said first carriage.

4. Apparatus in accordance with claim 1 wherein the distance between said first and second rollers is less than the distance between the pair of rollers on the second carriage.

5. Glass container inspection apparatus comprising a conveyor for conveying a glass container through a test area in a straight line at uniform speed, a first reciprocal carriage mounted above said conveyor for reciprocal movement parallel to said conveyor, said carriage supporting a downwardly extending plunger mounted for movement into and out of contact with a container on the conveyor, means for causing a neck on the container to rotate about the longitudinal axis of the neck while permitting the axis of the body of the container to be inclined to said neck axis or out of round while holding the container downwardly against vertical forces generated by rotation of the container body, said means including first and second rollers supported by said plunger, said rollers being spaced apart for a distance which is less than the outer diameter of the neck of the container and being supported above the conveyor, said means including an endless belt alongside the conveyor for engaging a side of the container and rotating the container, a second reciprocable carriage on the opposite side of the conveyor from said first carriage, said second carriage being mounted for synchronized movement with said first carriage, said second carriage having a pair of spaced rollers for rolling contact with the container and for holding the container into contact with said belt and said first and second rollers, and detector means for detecting defects in the glass container, said detector means being supported by one of said carriages for movement therewith, and said first and second rollers each having a horizontal flange for opposing said vertical forces.

6. Apparatus in accordance with claim 5 including a mount for a line over finish sensor, said sensor mount being supported by said plunger.

7. Apparatus in accordance with claim 5 including a brake block at the downstream end of said belt for causing the container to loose contact with the belt and stop rotating.

* * * * *